May 26, 1959 O. DOHLER ET AL 2,888,597

TRAVELLING WAVE OSCILLATOR TUBES

Filed Dec. 11, 1953 5 Sheets-Sheet 1

May 26, 1959 O. DOHLER ET AL 2,888,597

TRAVELLING WAVE OSCILLATOR TUBES

Filed Dec. 11, 1953 5 Sheets-Sheet 3

TRAVELLING WAVE OSCILLATOR TUBES

Filed Dec. 11, 1953 5 Sheets-Sheet 4

United States Patent Office 2,888,597

Patented May 26, 1959

2,888,597

TRAVELLING WAVE OSCILLATOR TUBES

Oscar Dohler and Jean Nalot, Paris, France, assignors to Compagnie Generale de Telegraphie Sans Fil, a corporation of France Application December 11, 1953, Serial No. 397,754

Claims priority, application France December 13, 1952

19 Claims. (Cl. 315—3.5)

It is a conventional practice to use a magnetron as a high power oscillator for microwave ranges.

With this type of tube, outputs of several hundred watts are possible with an acceptable efficiency. There are, however, several disadvantages. Its oscillation frequency is substantially determined by its structural characteristics and it is very difficult to vary this frequency. To vary this frequency it is necessary to use complicated mechanical adjusting devices. The latter can vary the frequency of the magnetron only over a very narrow range. Furthermore, if the magnetron is to operate correctly, it must be perfectly matched to its load. Now, the latter, which may be for example an antenna, may be subject to mechanical action (wind, different weather conditions) which affects its input impedance. The resultant mismatching, however slight this may be, often lowers the output of the magnetron to a considerable extent.

The magnetron, however, has the advantage that its operational frequency is practically independent of variations in the D.C. voltage applied between the anode and the cathode.

On April 9, 1952, there was filed under the name of B. Epsztein, with an assignment to the same assignee as the present application, a patent application Serial No. 281,347 for "Backward Travelling Wave Oscillators," having for its object a new travelling wave oscillator known as a "Carcinotron" tube, "Carcinotron" being a registered trademark. With this tube, it is also possible to produce high power outputs with acceptable efficiency.

In this tube, the oscillation frequency may be easily adjusted by varying the velocity of an electron beam. It is therefore much more flexible in operation than the magnetron. Further, even a substantial mismatching of the load has only a negligible effect on its operation. This tube, however, has the disadvantage that its operational frequency is strictly dependent on the velocity of the beam. This frequency is therefore unstable when the D.C. voltage applied to the tube is subject to fluctuations.

The present invention has for its principal object to provide a travelling wave oscillator of the above mentioned type but whose oscillation frequency is independent of the fluctuations in the D.C. voltage applied between two electrodes of the tube.

The invention has for a further object to provide means whereby this frequency may be easily adjusted over a wide range solely by mechanical tuning devices.

The invention will be better understood from the ensuing description with reference to the accompanying drawings, given merely by way of example, and in which.

Figures 9, 10:
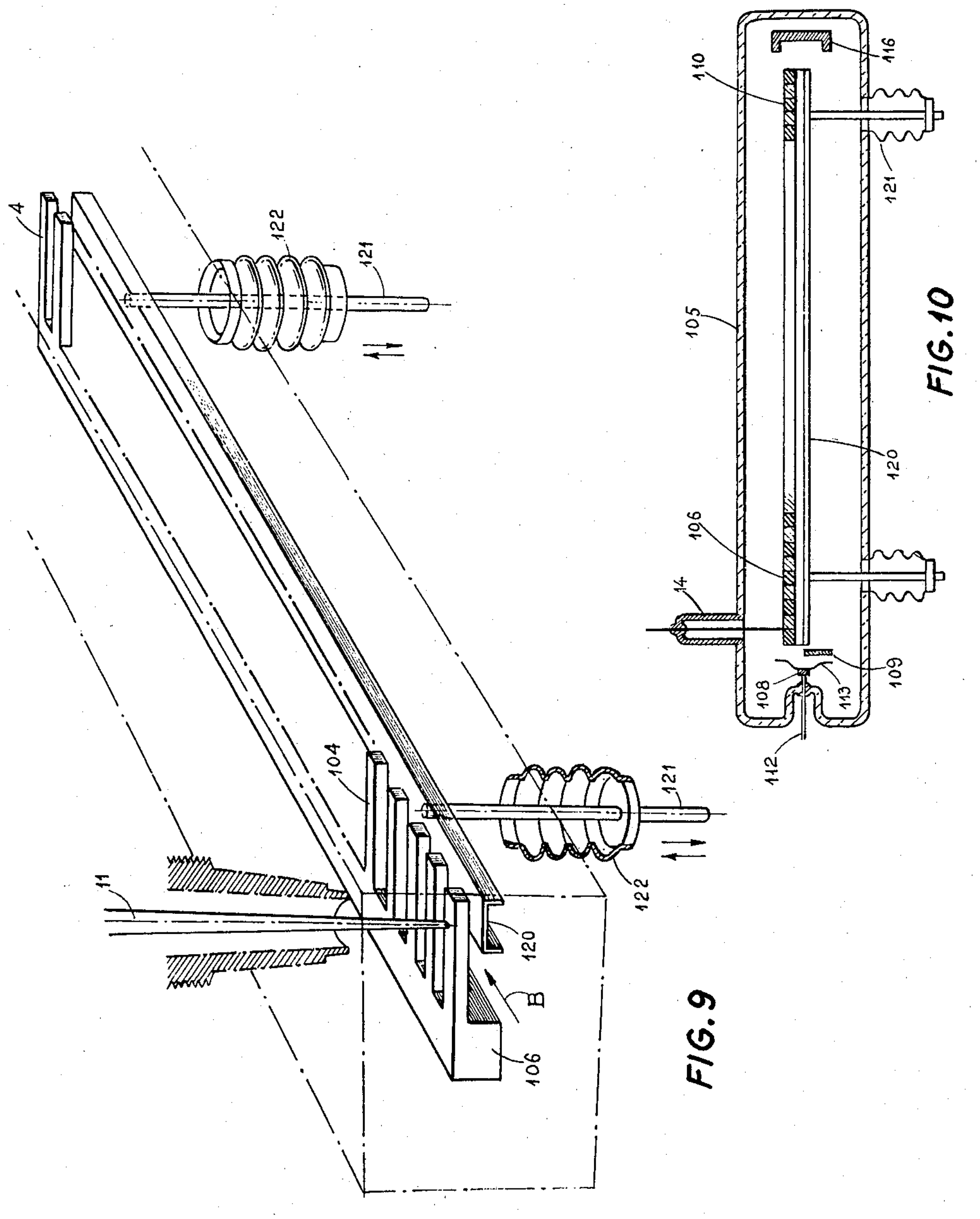
Fig. 9 shows in perspective a partial view of a tube according to the invention which is equipped with a delay line of the type shown in Fig. 5.
Figures 11, 12:
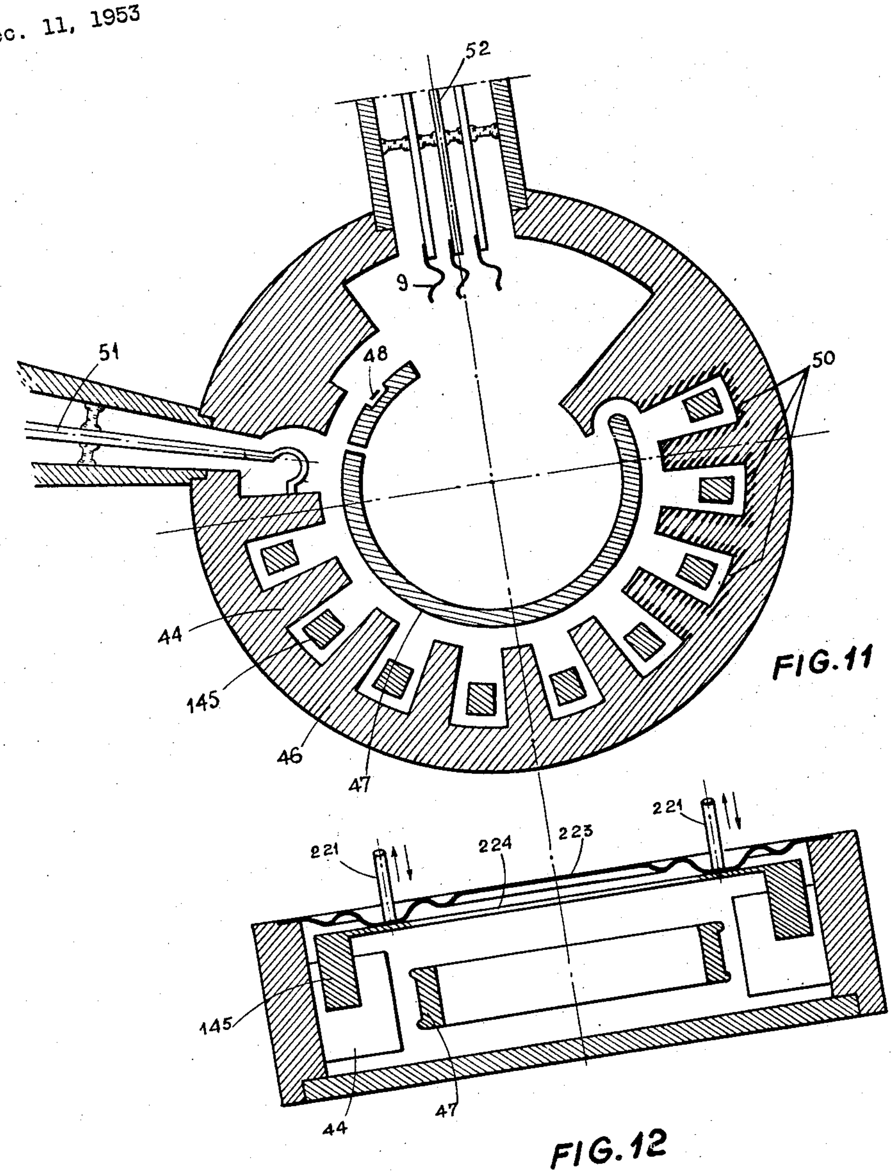

Fig. 10. shows a longitudinal sectional view of a tube shown in Fig. 9;

Figs. 11 and 12 show respectively transverse and axial sectional views of another embodiment of the invention.

Figure 1:
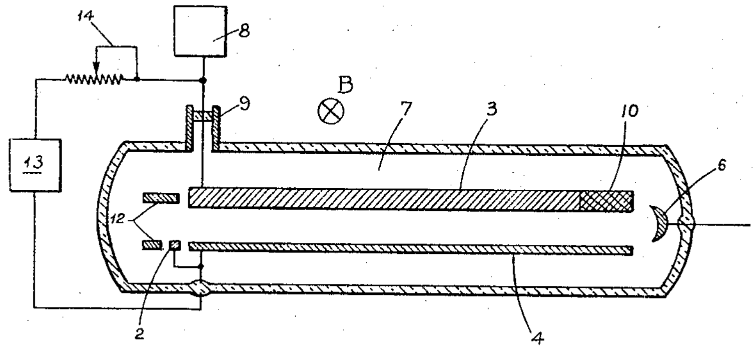
Fig. 1 shows a diagrammatic sectional view of a known-type "Carcinotron" tube.

In Fig. 1 there is shown an oscillator tube of the type described in the above-mentioned copending patent application, namely the type comprising crossed magnetic and electric fields. It comprises, as is described in that application, inside an evacuated envelope 7, an electron gun 2, a delay line 3, a negative electrode 4, which is parallel to the latter, and a collector 6.

The cathode of the gun 2 is at a negative potential with respect to the delay line 3 and to the collector 6, which are at a potential $V_1$, and a direct current potential difference V provided by a source 13 is applied between the two electrodes 3 and 4. This potential may be varied by means of any suitable device 14. Absorbing means 10 for absorbing U.H.F. energy are disposed at the end of the line 3 opposite to that at which the gun is disposed. A constant and uniform magnetic field B whose lines of force are perpendicular to the plane of the figure is created, for example by a magnet, in the space between the electrodes 3 and 4. Further, electronic optical means are provided to direct the beam, for instance electrodes 12 cooperating with the electrode 4 as described in the copending application Serial No. 150,357 filed on March 18, 1950 by D. Charles, now Patent No. 2,693,921.

The electron beam emitted by the cathode is propagated between the two electrodes 3 and 4 with a mean velocity equal to $$\frac{E}{B}$$

where E is the electric field created in the space between these electrodes by the potential difference $V_0$.

It is also known from the above patent application Ser. No. 281,347 that when the necessary voltages are applied to the tube shown in Fig. 1, it oscillates, i.e., a travelling wave is propagated along the axis of the beam in the delay line 3 at a phase velocity equal to $$\frac{E}{B}$$

the U.H.F. energy being propagated in a direction opposite that of the beam i.e. from the end of the delay line remote from the cathode towards the output 9 and the load 8.

According to the above patent application, Ser. No. 281,347, similar oscillators may be provided but without using a magnetic field perpendicular to the electric field. In such tubes the velocity of the electrons is governed by an acceleration voltage. The wave is produced according to the same mechanism as in the "Carcinotron" tubes having a magnetic field.

It is also known that in travelling wave oscillators of the above-mentioned type, the oscillation frequency varies when the beam velocity varies. The beam velocity varies when the field E or beam accelerating voltage varies, that is when the potential difference between the electrodes 3 and 4 or between the anode and the cathode varies. When the velocity of the beam is changed, the phase velocity of the wave, which is equal thereto, also changes.

Figure 2:
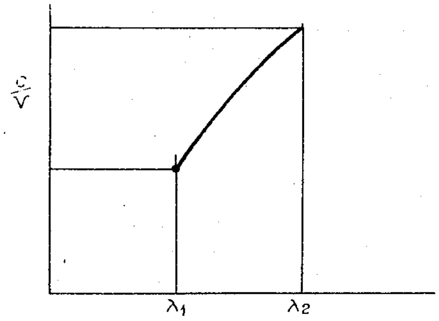
Fig. 2 shows what is called the "dispersion curve" of the tube shown in Fig. 1.

If the ratio $c/v$ is plotted as ordinates, $v$ being the phase velocity and $c$ the velocity of light, and the wavelength of the emitted waves is plotted as abscissas, the curve shown in Fig. 2 is obtained. This curve is called the "dispersion curve," "dispersion" being defined as the slope of the curve $$\frac{c}{v}=f(\lambda)$$

in the pass band of the delay line. This shows that a variation in the voltage applied, i.e. in $V_0$, brings about a variation in the emitted frequency.

Now, in some applications it may be desirable that even considerable variations in applied voltages have only a very slight influence on the emitted frequency. In other words, it may be desirable to use tubes which emit at a strictly constant frequency which is substantially independent of the applied voltages. This is particularly so in the case of centimeter waves links, or of electromagnetic detecting devices.

According to the invention, to obtain this result the tube shown in Fig. 1 is provided with a delay line which is such that for the whole of its pass band the wavelength $\lambda$ of the emitted wave is only slightly affected by large variations in the ratio $c/v$. The curve obtained under these conditions is a "high dispersion curve."

By way of illustration, the delay lines used according to the invention are such that a variation of the order of 20 to 50% in the ratio $c/v$ brings about a variation of the order of only 1% in the wavelength of the emitted wave.

Figure 3:
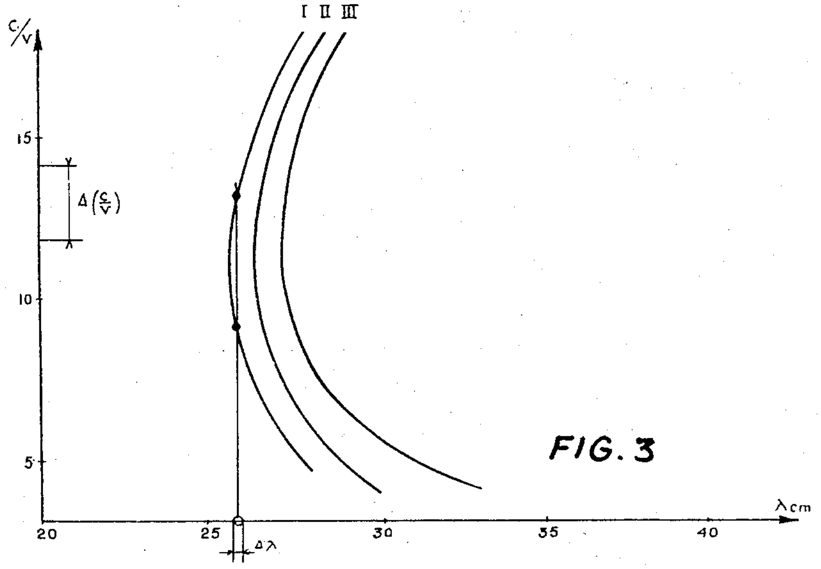
Fig. 3 shows a group of "dispersion curves" of a tube according to the invention.

Fig. 3 shows a group of dispersion curves which satisfy this condition.

It can be seen that with a delay line having the dispersion curve I, a variation in the ratio $c/v$ from 9 to 15 has practically no effect on the wavelength of the wave transmitted. Experiments have shown that it is difficult to widen these limits.

Now, the applicants have found that for a delay line to be highly dispersive, it is necessary that the coupling coefficient between the delay elements constituting this line be small.

If it were desired to widen still more the aforementioned limits, it would be necessary to decrease still more this coupling coefficient. This latter would be so small that no wave propagation would be possible along the delay line.

To determine whether a given delay line is suitable for the tube according to the invention, the simplest method is to feed to this line signals having different frequencies and to measure for each wave the wavelength in the line. In this way, the curve $$\frac{c}{v}=f(\lambda)$$

is obtained, where $\lambda$ is the wavelength in free space.

The nature of a high dispersion delay line might be defined in the following manner. This line is such that the ultra high-frequency field is almost entirely concentrated inside the body of the line, the ultra high-frequency field, surrounding the body of the line in the region where the beam is propagated, being just sufficient to cause the interaction between the beam and the ultra high-frequency wave being propagated in the delay line. Two types of delay lines may be considered as high dispersion lines: firstly, the lines in which the coupling of one of the delaying elements constituting the line to the next is both electric and magnetic and one compensates substantially the other; and secondly, delay lines which may be the seat of intense ultra high-frequency currents but which have a sufficiently large section so that the ultra high-frequency field is almost entirely concentrated therein.

It is also known that a U.H.F. delay line may be considered as equivalent to a series of filterlike elements, or elementary filtercells, with lumped impedances. Filterlike elements, or cells, are respectively electrically equivalent to the geometrically periodical delay elements constituting the delay line. A delay line is a high dispersion delay line if these filterlike elements, or cells, are loosely coupled to each other. This again may result either from the fact that the delay line has a large section solid body, and that, as a consequence, the U.H.F. field is substantially concentrated within said body, or from the fact that in each element, or cell, electric and magnetic couplings are equivalent and thus compensate each other.

Figure 4:
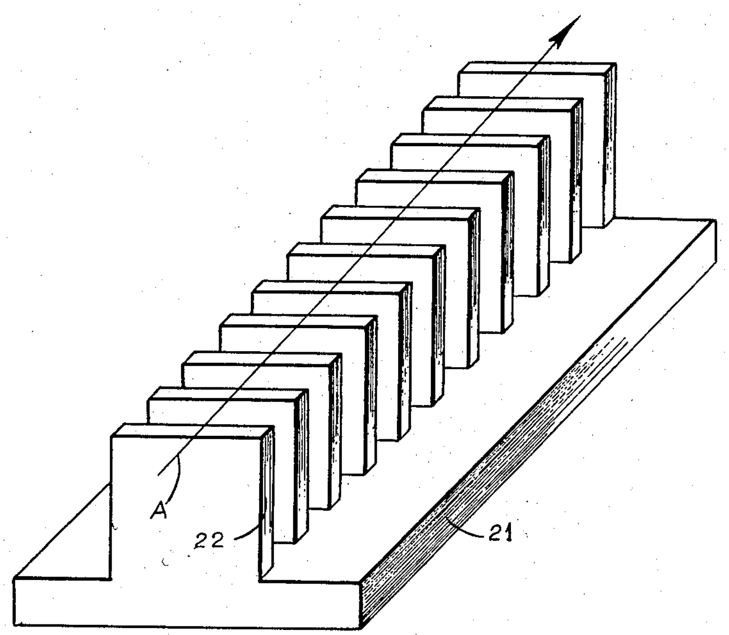
Fig. 4 shows a perspective view of an embodiment of a delay line which may be used in a tube according to the invention.

Fig. 4 shows a delay line which may be used in accordance with the invention, namely a vane-type delay line.

This delay line comprises a number of vanes 22 which are in the form of identical, equispaced and rectangular parallelepipeds. These vanes are fixed to a metallic body 21.

This type of delay line has the desired high dispersion; it possesses, therefore, a narrow pass band. When this type of line is employed in the tube according to the invention, the electron beam is directed in a direction parallel to the arrow A (Fig. 4).

Figure 5:
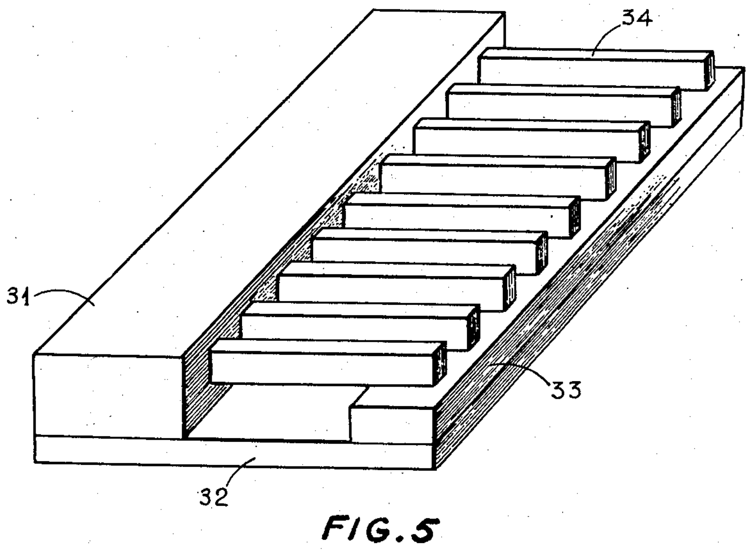
Figs. 5 and 6 show two other embodiments of delay line which may be used.
Figures 6, 7, 8:
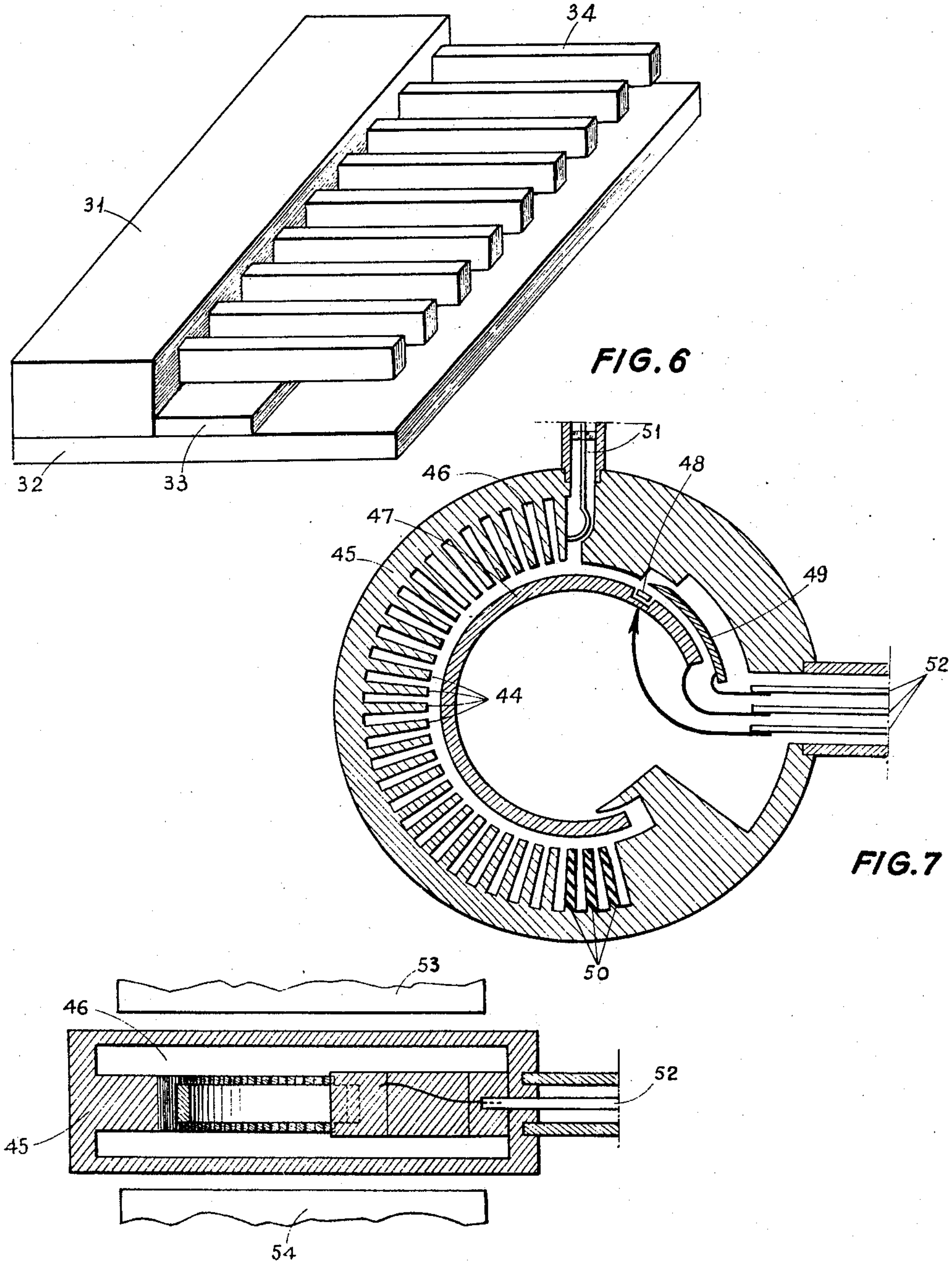
Figs. 7 and 8 show sectional views respectively through a transverse plane and a diametral plane of an embodiment of a tube according to the invention which is equipped with a delay line similar to that shown in Fig. 4.

Figs. 5 and 6 show in perspective two types of comb-type delay lines which may also be used according to the invention.

This type of delay line comprises parallel and parallelepipedic fingers 34 which extend from a body 31 which is also parallelepipedic. The unit is disposed on a plate 32. If this delay line were formed solely by elements 31, 32 and 34, it would have too high a dispersion and the propagation of a wave would be impossible.

It may be considered that in this line each delaying, or filterlike, element is defined by the symmetry plane of each of the fingers 34. The coupling of each element to the other is constituted by: (*a*) a magnetic coupling which takes place essentially in the portion of this finger 34 adjacent the body 31 as in this region the electrical currents are maximum; (*b*) an electric coupling which takes place essentially at the free ends of the fingers 34 since in this region U.H.F. voltages are maximum.

Experience shows that both couplings substantially compenate each other. Accordingly the coupling between the various delaying or filterlike elements is very loose.

To increase to the desired extent the coupling coefficient between the various elements, a metallic strip 33 is placed in the region where the high-frequency field is intense, that is in the neighbourhood of the fingers 34. This strip couples one element 34 to the next and makes the propagation of the wave possible. In Fig. 5 the strip 33 is placed on the plate 32 near the end of the fingers 34. In Fig. 6 it is disposed adjacent the body 31.

The dispersion of such a delay line is quite sufficient for the intended application.

Fig. 7 shows a tube according to the invention which is of the type having crossed electrical and magnetic fields and is equipped with a delay line equivalent to that shown in Fig. 4 and comprising fingers 44. This line is contained in an envelope 45 the lateral wall of which is in the form of a cylinder of revolution. This wall is metallic. On its inner face are fixed vanes 44 which form the delay line 46. This delay line is in the shape of a cylindrical ring, the structure and physical and electrical properties of which are identical to those of the delay line shown in Fig. 4. An electrode 47 is disposed concentrically with the delay line which has a negative potential relative to the delay line. In this electrode is housed a cathode 48 which has a substantially similar potential. The emitted beam is focussed in known manner by the electron optical means 49.

The few last vanes 50, which are situated at the end of the line opposite to the cathode, support an absorbing layer, represented by cross-hatching, the latter being for the reason indicated in the above-mentioned patent application Ser. No. 281,347. The connections 52 feed the various electrodes. The tube further comprises a coaxial output for collecting the U.H.F. energy produced. The tube is subject to the action of a transverse magnetic field produced by the polar elements 53 and 54 (Fig. 8). This tube oscillates at a frequency which is practically independent of the voltages applied to the electrodes 45, 47, 48 and 49 respectively.

The frequency of the tube according to the invention, while not affected by the D.C. voltage fluctuations, may be mechanically regulated as described hereinafter.

Fig. 9 shows in perspective certain elements of a tube according to the invention, this tube being for the sake of illustration without transverse magnetic field. The same tube is shown in its entirety in transverse section in Fig. 10.

This tube comprises a comb-type delay line, but the plate, such as the plate 32 shown in Fig. 5, is not included. The bar 33 of Fig. 5 is replaced in Figs. 9 and 10 by an elongated bar 120 which is parallel to the body of the comb and faces the ends of the fingers.

This bar 120 may be displaced in a direction perpendicular to the fingers of the comb and thus may be moved toward or away from these fingers. This operation is effected from outside the tube by any suitable means, for example by rods 121. To each position of the bar 120 corresponds a different dispersion curve. In other words, the wavelength of the wave which is propagated along the delay line will vary as a function of the position of the bar. The arrow A shows the path of the electron beam.

Fig. 3 shows three dispersion curves I, II and III respectively corresponding to three different positions of the bar 120.

The tube (Fig. 10) comprises a cathode 108, a control grid 113 and an electron optical system 109 concentrating the electrons in a beam which is propagated in the neighbourhood of the line 106 in the direction of the arrow (Figure 9). The line 106 is at a high positive potential relative to the cathode 108. The connections 112 provide the voltages necessary for the operation of the tube.

The unit is housed in an envelope 105. A coaxial outlet 114 allows the energy to be collected at the end of the delay line 106 close to the cathode. The delay line 106, at the other end, is provided with an absorbing layer 110. A collector 116 is provided as usually.

The general structure of this tube is more fully described in the above mentioned copending application.

Such a tube will oscillate at a frequency which is substantially independent of the voltages applied between the electrodes 106 and 108, since the dispersion of the line is great. Furthermore, it is possible to adjust the oscillation frequency by displacing the bar 120 with respect to the fingers 104.

Thus, there is obtained an oscillator whose frequency may be readily adjusted over a considerable range (10 to 20% of the central frequency) by mechanical means. This is an important advantage over the magnetron, the frequency of which it is difficult to vary over a comparable range by mechanical means.

It should be noted that an identical result may be obtained if the bar 120 is displaced along the axis of the fingers.

Figs. 11 and 12 show a tube according to the invention which is circular in construction and which also has mechanical tuning means. This tube is similar in many respects to that shown in Figs. 7 and 8, similar reference numerals denoting similar elements in the two figures, but it differs from the tube shown in Figs. 7 and 8 in that between the vanes 44 of the delay line 46 are disposed metallic vanes 145 which are symetrically interdigitated in the vanes 44. These vanes 145 are carried by a circular ring 224 which is coaxial with the tube. The tube is closed at one of its end faces by a diaphragm 223. Rods 221 are integrally connected with the diaphragm 223 and so is the ring 224.

Thus the vanes 145 may be displaced within the tube by displacing the rods 221.

The vanes 145 have the same action on the delay line 46 of Figs. 11 and 12 as the bar 120 has on the delay line 106 shown in Fig. 9. They vary the coupling between adjacent elements 44. For a given depth of overlap of the vanes 44 and 145, the delay line has a given dispersion curve and this dispersion curve changes for each adjustment of the tube. Thus there is again obtained a mechanical device for adjusting the output frequency of a tube whose oscillation frequency is independent of the fluctuations of applied D.C. voltages.

It is obvious that many other tubes based on the same principle may be constructed.

In addition to the aforementioned advantages, the tube according to the present invention is an improvement on the magnetron in that it may provide a higher power. The cathode is mounted outside the interaction space and is, in consequence, more easily cooled. The delay lines are long and solid and absorb the energy losses due to the impact of badly focussed electrons more easily than an anode of a magnetron.

What we claim is:

1. An ultra high frequency oscillator tube the oscillation frequencies of which are essentially unaffected by fluctuations of the applied voltages comprising: delay line means having a high dispersion and including a plurality of filterlike elements constituting a geometrically periodical structure to thereby provide a loose coupling between adjacent ones of said elements when the tube is oscillating, an electron emissive source adjacent one end of said line means and positioned to emit a beam of electrons in coupled relationship with said line means thereby to induce electromagnetic wave energy in said line means and to interact with a space harmonic thereof said line means having its two ends mutually uncoupled, means disposed at least at the other end of said line means for absorbing ultra high frequency energy propagated along said line means in the same direction as the beam thereby substantially to prevent reflections from said other end and thus to render said line means electrically aperiodic, means for directing said beam of electrons along a path substantially parallel to said line means and at a velocity substantially equal to the apparent or phase velocity of a negative space harmonic of electromagnetic wave energy propagating in said line means in the opposite direction to the beam and means adjacent said source for transferring said energy to an external load circuit.

2. An ultra high frequency oscillator tube the oscillation frequencies of which are essentially unaffected by fluctuations of the applied voltages comprising: delay line means with a high dispersion and including a body of geometrically periodical structure with the section thereof being large enough to concentrate within said body substantially all the U.H.F. field produced when tube is oscillating, an electron emissive source adjacent one end of said line means and positioned to emit a beam of electrons in coupled relationship with said line means thereby to induce electromagnetic wave energy in said line means and to interact with a space harmonic thereof, said line means having its two ends mutually uncoupled, means disposed at least at the other end of said line means for absorbing ultra high frequency energy propagated along said line means in the same direction as the beam thereby substantially to prevent reflections from said other end and thus to render said line means electrically aperiodic, means for directing said beam of electrons along a path substantially parallel to said line means and at a velocity substantially equal to the apparent or phase velocity of a negative space harmonic of electromagnetic wave energy propagating in said line means in the opposite direction to the beam, and means adjacent said source for transferring said energy to an external load circuit.

3. An ultra high frequency oscillator tube the oscillation frequencies of which are substantially unaffected by fluctuations of the applied voltages comprising: a delay line with means producing a high dispersion therein and including a plurality of delaying elements constituting a geometrically periodical structure, said structure providing between said elements, when the tube is oscillating, and electrical coupling and a magnetic coupling substantially of the same magnitude, and electron emissive source adjacent one end of said line and positioned to emit a beam of electrons in coupled relationship with said line thereby to induce electromagnetic wave energy in said line and to interact with a space harmonic thereof, said line having its two ends mutually uncoupled, means disposed at least at the other end of said line for absorbing ultra high frequency energy propagated along said line in the same direction as the beam thereby substantially to prevent reflections from said other end and thus to render said line electrically aperiodic, means for directing said beam of electrons along a path substantially parallel to said line and at a velocity substantially equal to the apparent or phase velocity of a negative space harmonic of electromagnetic wave energy propagating in said line in the opposite direction to the beam, and means adjacent said source for transferring said energy to an external load circuit.

4. In an ultra high frequency oscillator tube of the type which is essentially unaffected in the frequences of oscillations by fluctuations of the applied voltages comprising a delay line having its two ends mutually uncoupled, an electron emissive source adjacent one end of said line and absorbing means disposed at least at the other end of said line to render said line electrically aperiodic: said delay line having means providing therein a high dispersion and including a plurality of filterlike elements constituting a geometrically periodical structure to provide a loose coupling between said elements when the tube is oscillating.

5. A travelling wave tube according to claim 4 wherein said delay line is a vane type delay line.

6. In an ultra high frequency oscillator tube of the type which is essentially unaffected in the frequencies of oscillations by fluctuations of the applied voltages comprising a delay line having its two ends mutually uncoupled, an electron emissive source adjacent one end of said line and absorbing means disposed at least at the other end of said line to render said line electrically aperiodic: said delay line having means producing a high dispersion and including a body of geometrically periodical structure and a section large enough to concentrate within said body substantially all the U.H.F. field produced when the tube is oscillating.

7. In an ultra high frequency oscillator tube of the type which is substantially unaffected in the frequencies of oscillations by fluctuations of the applied voltages comprising a delay line having its two ends mutually uncoupled, an electron emissive source adjacent one end of said line and absorbing means disposed at least at the other end of said line to render said line electrically aperiodic: said delay line having means producing therein a high dispersion and including a plurality of delaying elements constituting a geometrically periodical structure to thereby provide between said elements, when the tube is oscillating, an electrical coupling and a magnetic coupling substantially of the same magnitude.

8. A travelling wave tube according to claim 7 wherein said delay line is a comb type line comprising a metallic body, a plurality of regularly spaced fingers extending perpendicularly therefrom and a metallic member extending parallel to said body in the vicinity of said fingers.

9. A travelling wave tube according to claim 8 further comprising first mechanical means for displacing said member with respect to said fingers to thereby vary the dispersion of said delay line and therewith vary the frequency of oscillations of said oscillator tube.

10. In an ultra high frequency oscillator tube of the type which is essentially unaffected in the frequencies of oscillations by fluctuations of the applied voltages comprising a delay line with means producing a relatively high dispersion therein and having its two ends mutually uncoupled, an electron emissive source adjacent one end of said line and absorbing means disposed at least at the other end of said line to render said line electrically aperiodic: said delay line with said means including a plurality of filterlike elements constituting a geometrically periodical structure thereby providing a loose coupling between said elements when the tube is oscillating, and a movable metallic member extending along the said elements of said line; means comprising a mechanical system for displacing said member with respect to said line and therewith vary the frequency of oscillations by varying said dispersion, and means exterior to said tube for actuating said system, thereby to control the frequency of the generated energy.

11. In an ultra high frequency oscillator tube of the type which is essentially unaffected in the frequencies of oscillations by fluctuations of the applied voltage comprising a delay line with means providing a high dispersion and having its two ends mutually uncoupled, an electron emissive source adjacent one end of said line and absorbing means disposed at least at the other end of said line to render said line electrically aperiodic: said delay line with said means having a body of geometrically periodical structure and a section large enough to concentrate within said body substantially all the U.H.F. field produced when the tube is oscillating, and a movable metallic member extending along the said delay line; means comprising a mechanical system for displacing said member with respect to said line, and means exterior to said tube for actuating said system, thereby to control the frequency of the generated energy essentially independently of any variations of the applied voltages.

12. In an ultra high frequency oscillator tube of the type relatively unaffected in the frequencies of oscillations by fluctuations of the applied voltages comprising a delay line with means producing therein a high dispersion and having its two ends mutually uncoupled, an electron emissive source adjacent one end of said line and absorbing means disposed at least at the other end of said line to render said line electrically aperiodic: said delay line with said means including a plurality of delaying elements constituting a geometrically periodical structure thereby providing between said elements, when the tube is oscillating, an electrical coupling and a magnetic coupling substantially of the same magnitude, and a movable metallic member extending along the said delaying elements of said line; means comprising a mechanical system for displacing said member with respect to said line, and means exterior to said tube for actuating said system, thereby to control the frequency of the generated energy.

13. In combination, a traveling wave tube comprising a delay line adapted for propagating electromagnetic waves in a predetermined direction, said line having two mutually uncoupled ends and having means imparting to said line a relatively narrow pass-band characteristic for said waves and including a metallic member extending parallel to said wave propagation direction near said line, first mechanical means for displacing said member in a direction at an angle to said wave propagation direction, and second mechanical means exterior to said tube for actuating said first mechanical means, thereby displacing said pass-band in the frequency spectrum within substantially broader limits than the width of said pass-band.

14. The combination as in claim 13, wherein said first mechanical means is connected to said member for varying the distance between said line and said metallic member while maintaining parallelism therebetween.

15. The combination as in claim 13, wherein said first mechanical means is connected to said member for displacing said member in a direction parallel to said line at a constant distance therefrom.

16. The combination as claimed in claim 13, wherein said delay line and said metallic member are of rectilinear structure.

17. The combination as claimed in claim 15, wherein said delay line and said metallic member are circularly curved coaxial structures.

18. A microwave oscillator which is essentially unaffected by fluctuations in the applied voltage comprising an electron source and a collector defining therebetween a path of electron flow, a wave guiding structure positioned along said path in which there is induced by the electron flow an electromagnetic wave which travels in a direction opposite that of electron flow, and means coupled to the said wave guiding structure for abstracting the induced wave, said wave guiding structure including means to render said wave guiding structure highly dispersive to thereby render the frequency of oscillations of said oscillator essentially unaffected by variations in the voltages applied thereto during operation.

19. A microwave oscillator according to claim 18 further comprising means for mechanically varying the dispersive characteristic of said wave guiding structure to thereby vary the frequency of oscillations over a relatively wide band.

References Cited in the file of this patent

UNITED STATES PATENTS

| | | |
|---|---|---|
| 2,367,295 | Llewellyn | Jan. 16, 1945 |
| 2,611,110 | Powers | Sept. 16, 1952 |
| 2,630,544 | Tiley | Mar. 3, 1953 |
| 2,636,948 | Pierce | Apr. 28, 1953 |
| 2,643,353 | Dewey | June 23, 1953 |
| 2,654,047 | Clavier | Sept. 29, 1953 |
| 2,683,238 | Millman | July 6, 1954 |
| 2,695,929 | Reverdin | Nov. 30, 1954 |
| 2,808,532 | Field | Oct. 1, 1957 |

OTHER REFERENCES

"Traveling Wave Tubes," by J. R. Pierce, pub. 1950 by D. Van Nostrand Co., New York, N.Y., pages 157 to 159.

"Comptes Rendus," July 21, 1952, pages 236–238.

Article by E. C. Dench, "Tele-Tech," for November, 1953, pages 64–66, 157–162.

Article by Kompfner and Williams, pages 1602 to 1611, Proc. of the I.R.E. for November, 1953.